United States Patent [19]
Hoyle

[11] Patent Number: 5,403,119
[45] Date of Patent: Apr. 4, 1995

[54] PERFORATED PILING FOR SOIL REMEDIATION

[75] Inventor: John A. Hoyle, Kernersville, N.C.

[73] Assignee: Four Seasons Environmental, Inc., Greensboro, N.C.

[21] Appl. No.: 5,580

[22] Filed: Jan. 19, 1993

[51] Int. Cl.⁶ ............................................. B09B 3/00
[52] U.S. Cl. .................................... 405/128; 405/258
[58] Field of Search ............... 405/128, 129, 258, 231, 405/253, 263

[56] References Cited

U.S. PATENT DOCUMENTS

| | | | |
|---|---|---|---|
| 4,593,760 | 6/1986 | Visser et al. | 166/267 |
| 4,660,639 | 4/1987 | Visser et al. | 166/267 |
| 4,832,122 | 5/1989 | Corey et al. | 166/266 |
| 4,895,085 | 1/1990 | Chips | 405/128 X |
| 4,945,988 | 8/1990 | Payne et al. | 405/128 X |
| 5,011,329 | 4/1991 | Nelson et al. | 405/128 |
| 5,017,289 | 5/1991 | Ely et al. | 405/128 X |
| 5,106,232 | 4/1992 | Metzer et al. | 405/128 |
| 5,161,914 | 11/1992 | Rahn et al. | 405/128 |

OTHER PUBLICATIONS

Cleanup of Releases From Petroleum USTs. U.S. Environmental Protection Agency. Wash. D.C. Apr. 1988.

Connor, R. 1988. Case Study of Soil Venting. Pollution Engineering. 20(7):74–78.

Hutzler, N. 1990. Soil Vapor Extraction of Organic Chemicals. Int'l Symposium on Hazardous Waste Treat.

Terra Vac In Situ Vacuum Extraction System U.S. Environmental Protection Agency. Cinc., Ohio Jul. 1988.

*Primary Examiner*—David H. Corbin
*Attorney, Agent, or Firm*—Rhodes Coats & Bennett

[57] ABSTRACT

An apparatus for recovering VOC contaminants from a surface or subsurface release. In one embodiment, the invention includes at least one vertical extraction piling having an interior void space and at least one perforated surface on the exterior of the piling. The upper end of the vertical piling is attached to a vacuum pump by means of conventional piping. The surface area over the piling is sealed to minimize infiltration of surface air or water. A suitable vacuum is applied and the VOC contaminates migrate through a perforated exterior section of the piling then into the interior void space. The contaminates are then transported by a conventional piping system to the vacuum source. Finally the contaminates are adsorbed, condensed, oxidized, or directly discharged into the air.

23 Claims, 6 Drawing Sheets

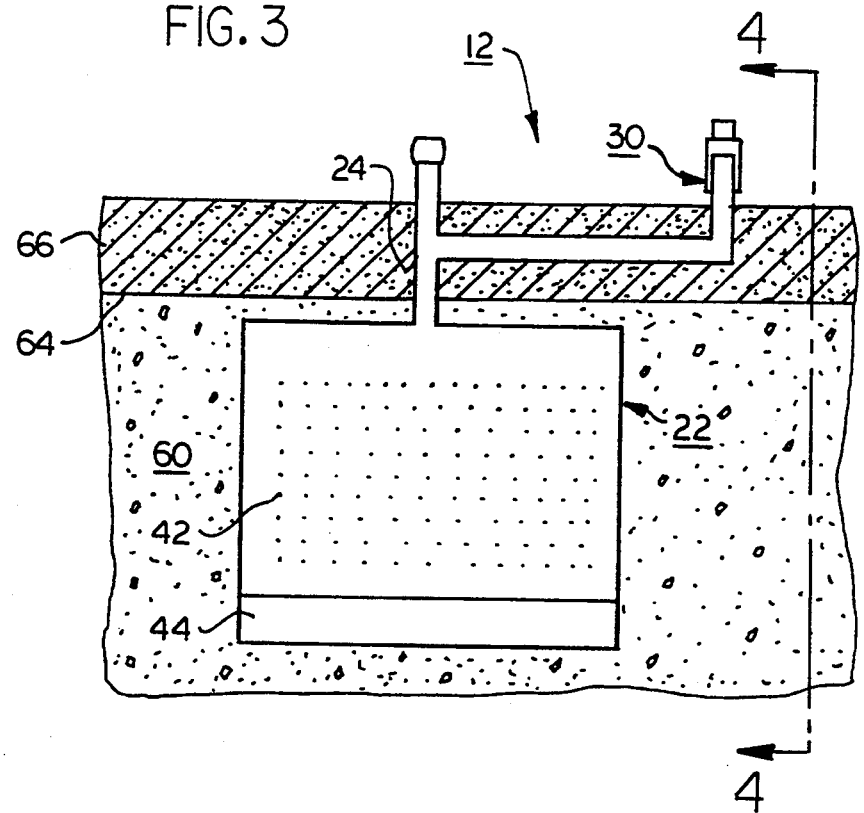
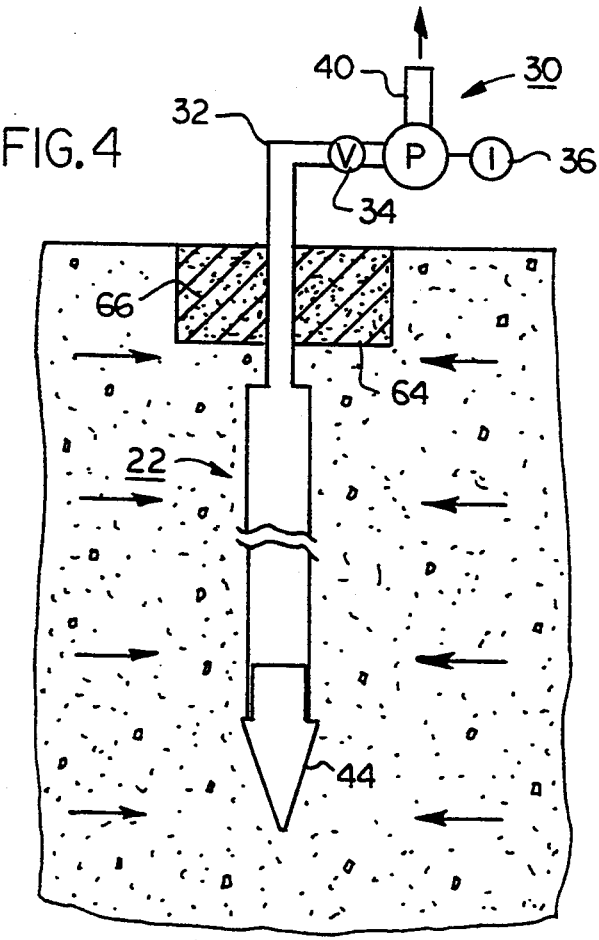

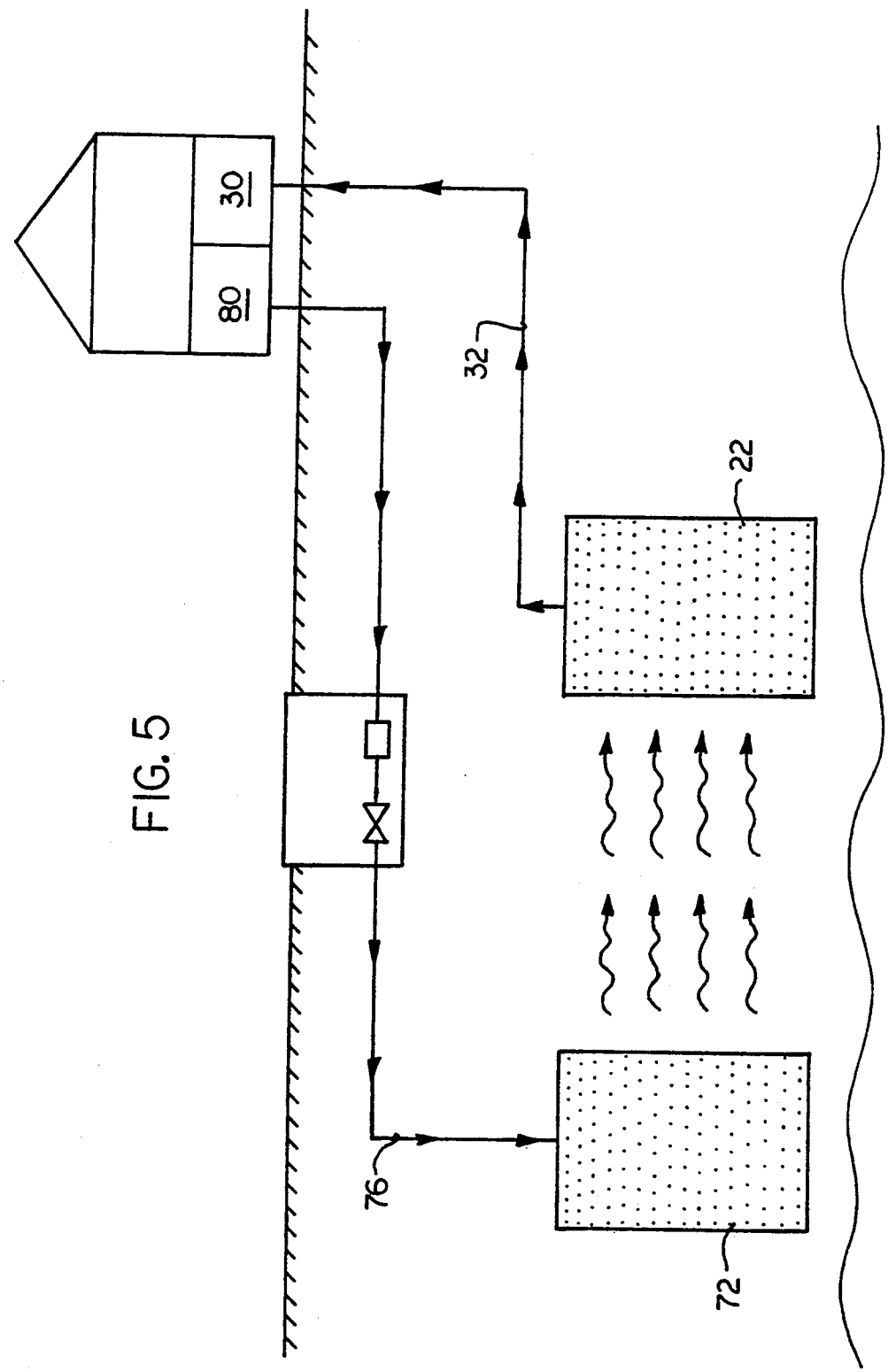

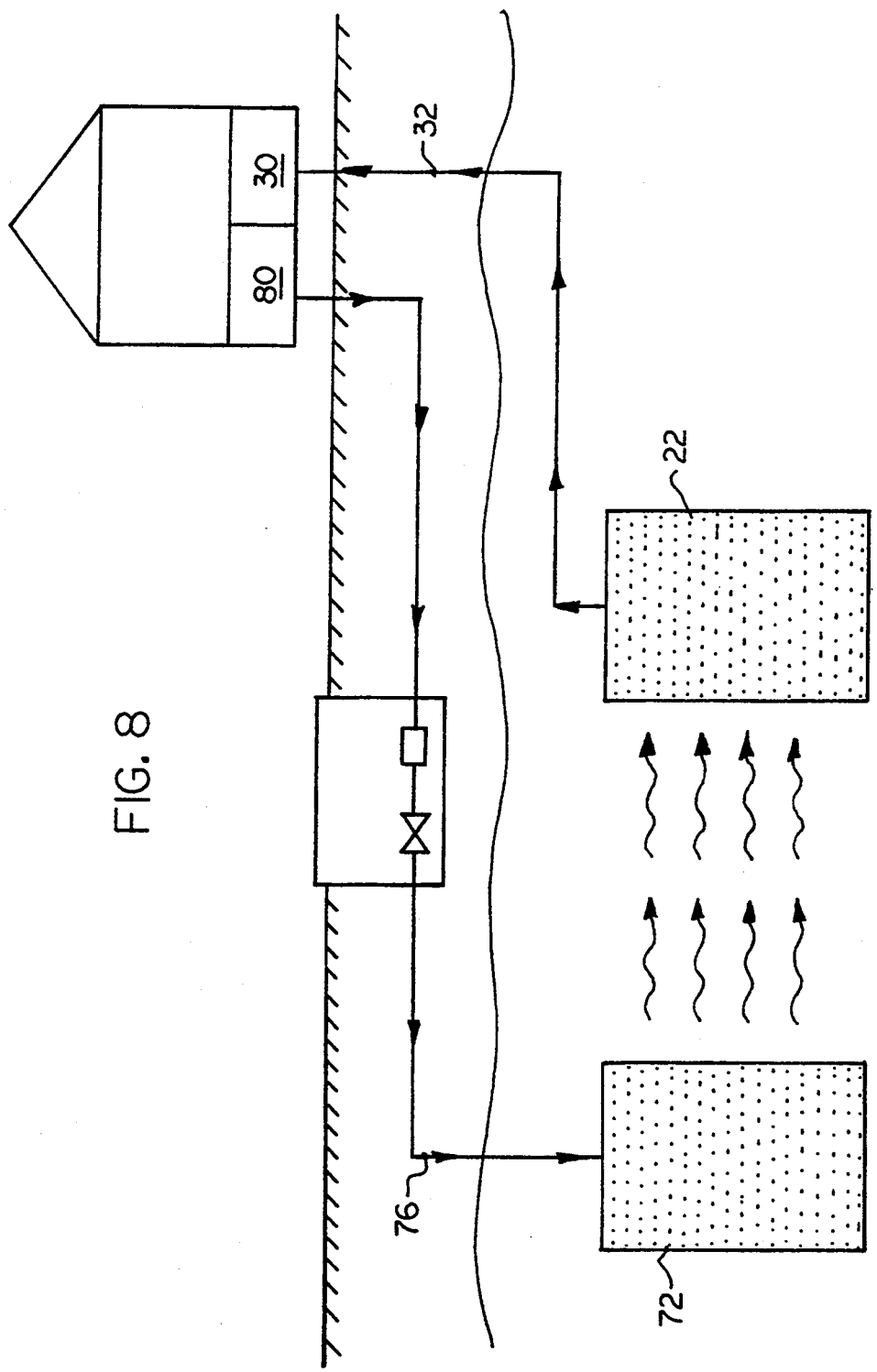

PERFORATED PILING FOR SOIL REMEDIATION

BACKGROUND OF THE INVENTION

1) Field of the Invention

The present invention generally relates to in-situ remediation of soil or ground water contaminated by volatile or semi-volatile organic compounds (VOCs or SVOCs) by vacuum extraction, air sparging, or enhanced biodegradation of organic compounds, and in particular to an apparatus for in-situ soil vacuum extraction of the contaminates and the process thereof.

2) Description of the Prior Art

Conventional methods of removing contamination from groundwater and soils include excavating the contaminated subsurface material and pumping contaminated water from subsurface materials to the surface for treatment. Both methods are expensive due to the volume of material which must be removed, treated, and disposed.

In-situ soil vacuum extraction (ISVE) involves the removal of volatile organic compounds (VOC's). Dissolved VOC's are present in the upper, unsaturated "vadose" zone above the groundwater. The dissolved VOC's approach an equilibrium concentration in the soil's pore space according to Henry's Law.

The contaminates can be aliphatic and/or aromatic hydrocarbons, halogenated hydrocarbons, or other volatile organic compounds. Many of these compounds have vapor pressures of between about 1 to 20 mmHg at room temperature. Accordingly, such compounds can be easily volatilized when subjected to a suitable vacuum or air flow.

The design and operation of ISVE remediation systems are based on the movement of gases in a porous media. Thus, a negative air pressure gradient exerted on the soil will induce migration of the subsurface VOC's. The VOC's can then be collected at extraction point(s) and discharged and collected at the surface. Accordingly, an ISVE remediation system must be designed in accordance with site specific subsurface conditions in order to maximize the rate of contaminant removal.

ISVE remediation systems may be either vertical or horizontal wells. Vertical systems become cost competitive with excavation and removal when the vadose zone exceeds about 20 feet in depth. Horizontal systems are more effective where contaminates are very shallow, i.e. less than about 20 feet. However, vertical well systems are prone to plugging.

The vacuum at the wellhead of conventional ISVE remediation systems is directly related to the range of influence (ROI) at the well and, therefore, the rate of removal of VOC's from the site. In addition, it is well known that the spacing of the wells between one another of conventional ISVE remediation systems is critical to the overall performance of the ISVE remediation system. This is due, in part, because the ROI can vary depending on the soil type and depth of groundwater.

For example, Malot and Wood applied a ISVE remediation system at a site in which 15,000 gallons of $CCl_4$ was spilled in an area where the top of the unconfined aquifer was 300 feet below the surface. Slotted pipes were installed at depths of 75 to 180 feet. A vacuum of 29.9 inches of Hg and a flow rate of 240 CFM was applied. After 90 days the vacuum stabilized at a ROI of 10 feet (Malot, James J. and Wood, P. R., "Low Cost, Site Specific, Total Approach to Decontamination", Conference on Environmental and Public Health Effects of Soils Contaminated with Petroleum Products, University of Massachusetts, Amherst, Mass. Oct. 30–31, 1985). Cited in Cleanup of Releases From Petroleum USRs. 1988. U.S. Environmental Protection Agency. Wash. D.C. April 1988.

Soil venting is also discussed by Connor, R. 1988. Case Study of Soil Venting. Pollution Engineering. 20(7):74–78. and Hutzler, N. 1990. Soil Vapor Extraction of Organic Chemicals. Int'l Symposium on Hazardous Waste Treatment: Treatment of Contaminated Soils, Air & Waste Management Association and U.S. EPA Risk Reduction Laboratory, Cincinnati, Ohio, Feb. 5–8, 1990.

U.S. Pat. Nos. 4,593,760 and Re. 33,102 (U.S. Pat. No. 4,660,639), issued to Visser et al., describe one ISVE remediation system for removing VOC's from the vadose zone. Wells are sunk vertically into the vadose zone. The well casing includes a lower perforated region. VOC's in the vadose layer enter the perforated casing and are pumped to the surface for treatment.

U.S. Pat. No. 4,832,122, issued to Corey et al., also describes another ISVE remediation system for removing VOC's from the vadose zone. Two sets of wells are sunk into the vadose zone. One well injects a fluid into the saturated zone below the plume of contamination. A second well, located above the plume, collects the fluid along with the VOC's from the plume, and pumps it to the surface for treatment.

ISVE remediation systems can have a great degree of success removing VOC constituents exhibiting relatively high vapor pressures and under the proper hydrogeologic settings. In addition, ISVE remediation systems are very cost competitive when compared with other alternatives, including physical removal and disposal in a secure landfill. However, conventional ISVE remediation systems perform poorly for areas having relatively high water tables and/or soils with an extremely high clay content.

An additional approach to ISVE involves the placement of horizontal trenches having a perforated conduit within a porous media and an additional conduit connected to a pump as described in U.S. Pat. No. 5,161,914, issued to Rahn and Chandler. This approach is most effective where contaminants are very shallow, less than 20 feet. However, if the soil excavated for placement of those trenches contains hazardous constituents, the soil itself is hazardous waste and will require disposal or off-site treatment at an approved facility. In addition, some sites requiring remediation have considerable underground obstacles such as utilities or process piping which increase the cost of or prohibit the trench installation It has therefore become desirable to develop an improved remediation apparatus having an increased working surface area and ROI than vertical wells while decreasing the possibility of the prior art problems involving poor performance in areas having relatively high water tables and minimizing the generation of soil requiring off-site disposal or treatment. In addition, the improved remediation apparatus may be installed at greater depths than conventional trenches while providing a greater ROI than the conventional vertical well approach.

SUMMARY OF THE INVENTION

The present invention is directed to an apparatus for recovering VOC contaminants from a surface or subsurface release. In one embodiment, the invention includes at least one extraction piling (PEP) having an interior void space and at least one perforated surface on the exterior of the piling. The upper end of the vertical piling is attached to a vacuum pump by means of conventional piping. The area over the piling is sealed to minimize infiltration of surface air or water. A suitable vacuum is applied and the VOC contaminates migrate through a perforated exterior section of the piling then into the interior void space. The contaminates are then transported by a conventional piping system to the vacuum source. Finally the contaminates are adsorbed, condensed, oxidized, or directly discharged into the air.

In a second embodiment (FIG. 5), intermediate ones of the pilings within the vadose zone are pressurized either by air or liquid fluids in either a heated or unheated state to transport or facilitate the biodegradation of VOC organic contaminates into another alternating vertical piling within the vadose zone having a negative pressure.

In a third embodiment (FIG. 6), intermediate ones of the vertical pilings installed within the saturated zone are pressurized either by air or liquid fluids in either a heated or unheated state to remove contaminates from the saturated zone while other alternating pilings being in the vadose zone exert a negative pressure, to transport or facilitate the biodegradation of contaminates from the saturated and vadose zones to collection within the negative pilings and transported by piping to the surface.

In a fourth embodiment (FIG. 7), intermediate ones of the vertical pilings within the vadose zone are pressurized by liquid fluids in either a heated or unheated state to transport or facilitate the biodegradation of contaminates within the vadose and/or saturated zone while other alternating vertical pilings within the saturated zone are used for recovery of the contaminates, ground water, or other liquids.

In a fifth embodiment (FIG. 8), intermediate ones of the vertical pilings installed within the saturated zone are pressurized by liquid fluids in either a heated or unheated state to transport or facilitate biodegradation of contaminates within the saturated zone while other alternating pilings within the saturated zone being connected to a pumping system are used for interception and recovery.

Accordingly, one aspect of the present invention is to provide an apparatus for removing volatile contaminates from the vadose and saturated zones of a contaminated area. The apparatus includes: (a) an elongated piling, having a pair of downwardly extending walls and a bottom, adjacent to the contaminated area; the piling having at least one perforated wall portion for receiving the volatile contaminates; (b) a conduit connected to the piling, the conduit having a imperforate portion for conducting the volatile contaminates from the piling; (c) sealing means upon the upper portion of the piling for preventing the entry air or other fluids from the surface above the piling into the piling; and (d) pump means connected to the conduit for pumping the volatile contaminates from the vadose and saturate zones, through at least one of the side walls of the piling through the conduit.

Another aspect of the present invention is to provide a collector for an apparatus for removing volatile contaminates from the vadose and saturated zones of a contaminated area. The collector includes: (a) an elongated piling, having a pair of downwardly extending walls and a bottom, adjacent to the contaminated area; the piling having at least one perforated wall portion for receiving the volatile contaminates; and (b) a conduit connected to the piling, the conduit having a imperforate portion for conducting the volatile contaminates from the piling.

Still another aspect of the present invention is to provide an apparatus for removing volatile contaminates from the vadose and saturated zones of a contaminated area. The apparatus includes: (a) an elongated piling, having a pair of downwardly extending walls and a bottom, adjacent to the contaminated area; the piling having a perforated wall portion for receiving the volatile contaminates; (b) a conduit connected to the piling, the conduit having a imperforate portion for conducting the volatile contaminates from the piling; (c) sealing means upon the upper portion of the piling for preventing the entry air or other fluids from the surface above the piling into the piling; (d) pump means connected to the conduit for pumping the volatile contaminates from the vadose and saturate zones, through at least one of the side walls of the piling through the conduit; (e) a second conduit positioned adjacent to the piling, the second conduit having a perforated portion for supplying a fluid; (f) a third conduit connected to the second conduit, the third conduit having a imperforate portion for conducting the fluid to the second conduit; and (g) second pump means connected to the third conduit for pumping the fluid through the third conduit, into the second conduit, through at least one of the side walls of the piling, and the vadose zone, whereby the fluid from the second pump means is drawn across the contaminated area by the pump means so that the volatile contaminates are carried with the fluid to the surface.

These and other aspects of the present invention will become apparent to those skilled in the art after a reading of the following description of the preferred embodiment when considered with the drawings.

BRIEF DESCRIPTION OF THE DRAWINGS

FIG. 3 is an enlarged cross-sectional view of the PEP system shown in FIG. 2, taken along line 3—3;

FIG. 4 is an enlarged cross-sectional view of the PEP system shown in FIG. 3, taken along line 4—4; and FIGS. 5–8 are cross-sectional views of alternative embodiments of the PEP system shown in FIGS. 2–4.

DESCRIPTION OF THE PREFERRED EMBODIMENT

Figure 1:
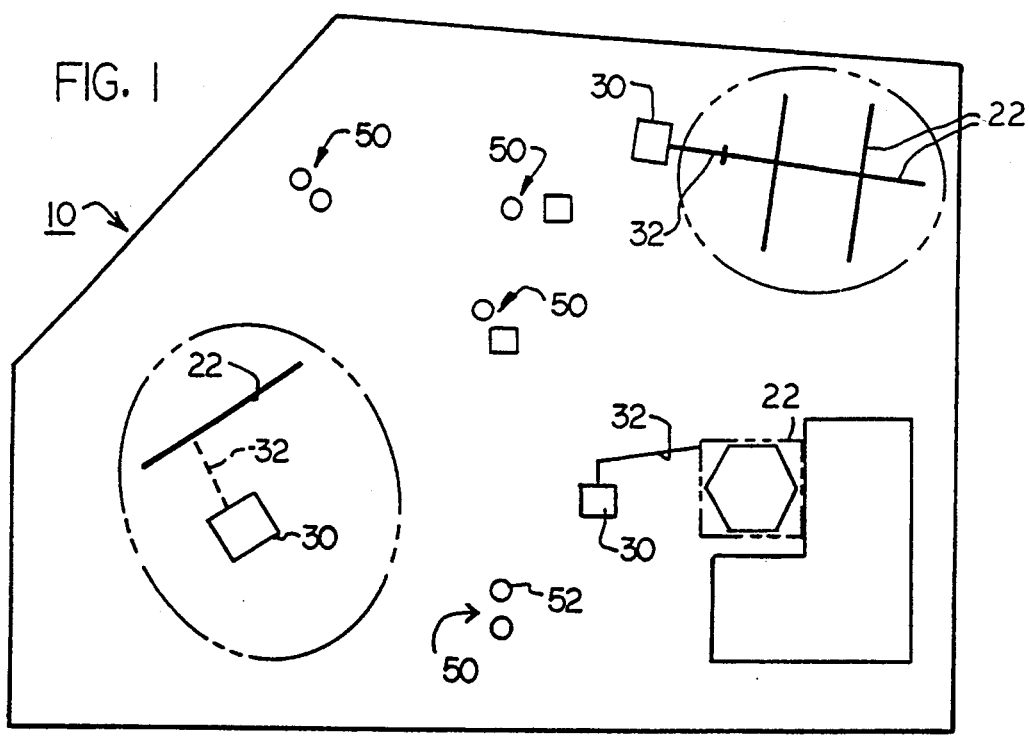
FIG. 1 is a plan view of an industrial site employing ISVE systems constructed according to the present invention.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and to FIG. 1 in particular, it will be understood that the illustrations are for the purpose of describing a preferred embodiment of the invention and are not intended to limit the invention thereto. As best seen in FIG. 1, an industrial site, generally designated 10 and employing PEP-ISVE remediation systems 12, 14 and 16 constructed according to the present invention, is shown. Each of these systems may have a different geometric lay out depending on the site specific hydrogeologic and surface conditions.

Figure 2:
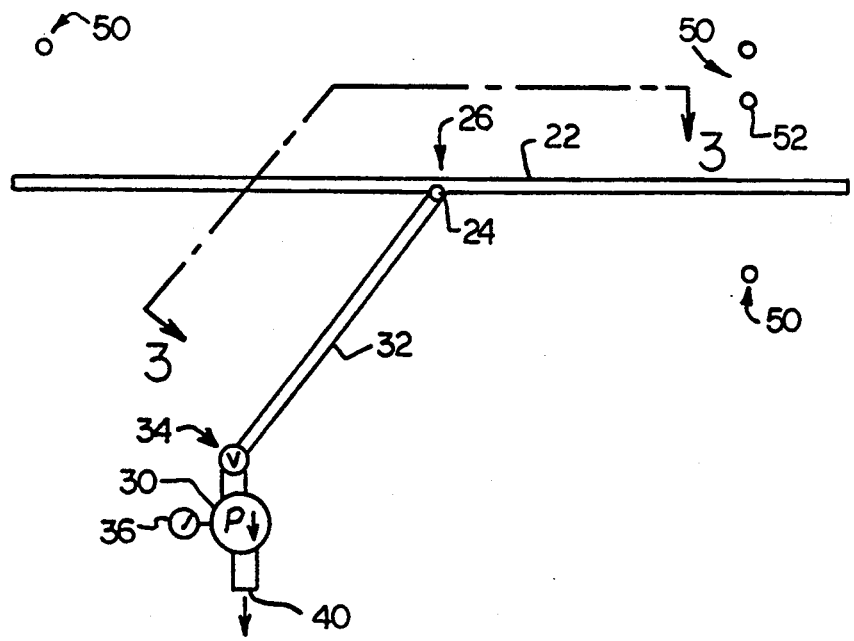
FIG. 2 is a plan view of one of the PEP systems shown FIG. 1, the view being generally diagrammatic.

FIG. 2 is a plan view of the perforated extraction piling (PEP) system 12 shown in FIG. 1, the view being generally diagrammatic. The primary element of the PEP remediation system 12 is the piling 22 itself. The piling 22 of the present invention is first installed by a conventional pile driver. The overall dimensions of the piling 22 were 14 feet long by 2 feet wide. The thickness of the piling 22 was approximately $1\frac{1}{2}$ inches. A vertical riser 24 of schedule 40 PVC pipe is connected to the top of piling 22 near its midportion 26.

An oil-less type vacuum pump 30 is connected at the riser 24 by means of conduit 32 for creating a source of negative air pressure. Control of the air flow entering the vacuum pump is by a relief valve 34. The relief valve 34 operates by allowing excess ambient air to enter the vacuum pump 30 in order that the desired negative pressure for the piling 22 can be maintained. A pressure gauge 36 located adjacent to the vacuum pump provides a measurement of the negative pressure at the pump.

The discharge 40 from the vacuum pump may be connected to a suitable sub-system (not shown) for collecting, treating, or disposing of the VOC's. For example, the gases may be collected in a storage tank. The volatile gases also may be discharged into the atmosphere where environmental constraints permit, adsorbed by activated charcoal, or destroyed by incineration.

An exhaust emission and monitoring sub-system (not shown) measures the VOC's on a periodic basis. The periodic measurements of VOC concentration and air velocity at system discharge versus time are used to calculate the total pounds per day of VOC's. The current limit of total VOC per day is dependent on the location of the contaminated site. Secondary means for disposal of VOC's greater than permissible limits include the aforementioned carbon adsorption and incineration.

Several "nests" of vacuum monitoring wells 50 are placed at specific distances and depths with respect to the piling 22 to monitor the ROI of the PEP system in the surrounding soil. Each nest includes several monitors 52 each at different depths to measure the pressure differential with respect to adjacent zones. Each monitor 52 consists of a well which is capped at the surface and equipped with a pressure gauge which can be read periodically and used to determine the overall ROI of the PEP system with respect to the dimensions of the VOC plume.

Turning to FIG. 3, there is shown an enlarged cross-sectional view of the PEP system shown in FIG. 2, taken along line 3—3. The vertical riser 24 is connected to the perforated piling 22 near its midportion. The piling 22 is hollow with the outer surfaces formed from $\frac{1}{4}''$ steel plate. At least one of the opposed surfaces of the piling is perforated with a plurality of 1/16 to $\frac{3}{4}$ inch diameter holes 42 over the lower portion of its height.

Preferably both sides of the lower portion of the piling 22 are perforated with $\frac{1}{4}$ inch diameter holes over 40% of the lower 11 feet of its height. The upper 3 feet of the piling is, preferably, solid which forms an air tight seal with the surface of the earth adjacent to the surface of piling 22. In addition, the upper portion of the piling 22 forms a plenum for collecting the gases received by the piling 22. The upper portion of the piling 22 also includes a plurality of threaded apertures for permitting eye bolts to be attached to the piling to allow the piling to be removed after use. Finally, the lower 6 inches of the piling 22 includes a tapered driver element 44 which is driven into the ground 60 and pulls the remainder of the piling 22 along with it.

As best seen in FIG. 4, a 6 mil polyethylene sheet 64 may be laid over the upper end of the piling 22 to minimize surface air and water from entering the piling. The final 2–5 feet of above the piling 22 is filled with a mixture 66 of backfill and bentonite clay to form a water and air resistant cap above the piling. A concrete plug may be added where required for safety. The vacuum pump 30, preferable capable of about 320 CFM at 15 inches of Hg, is then connected to the pipe riser 24 leading to the piling 22. The ROI of the PEP system 12 is measured by means of monitors 52.

FIGS. 5–8 are cross-sectional views of alternative embodiments of the PEP system 12 shown in FIGS. 2 through 4. The primary element of the alternative remediation system is the piling 22 itself and either a second piling 72 or vertical well (not shown) for injecting a heated fluid of air or liquid into the contaminated soil.

Figure 6:
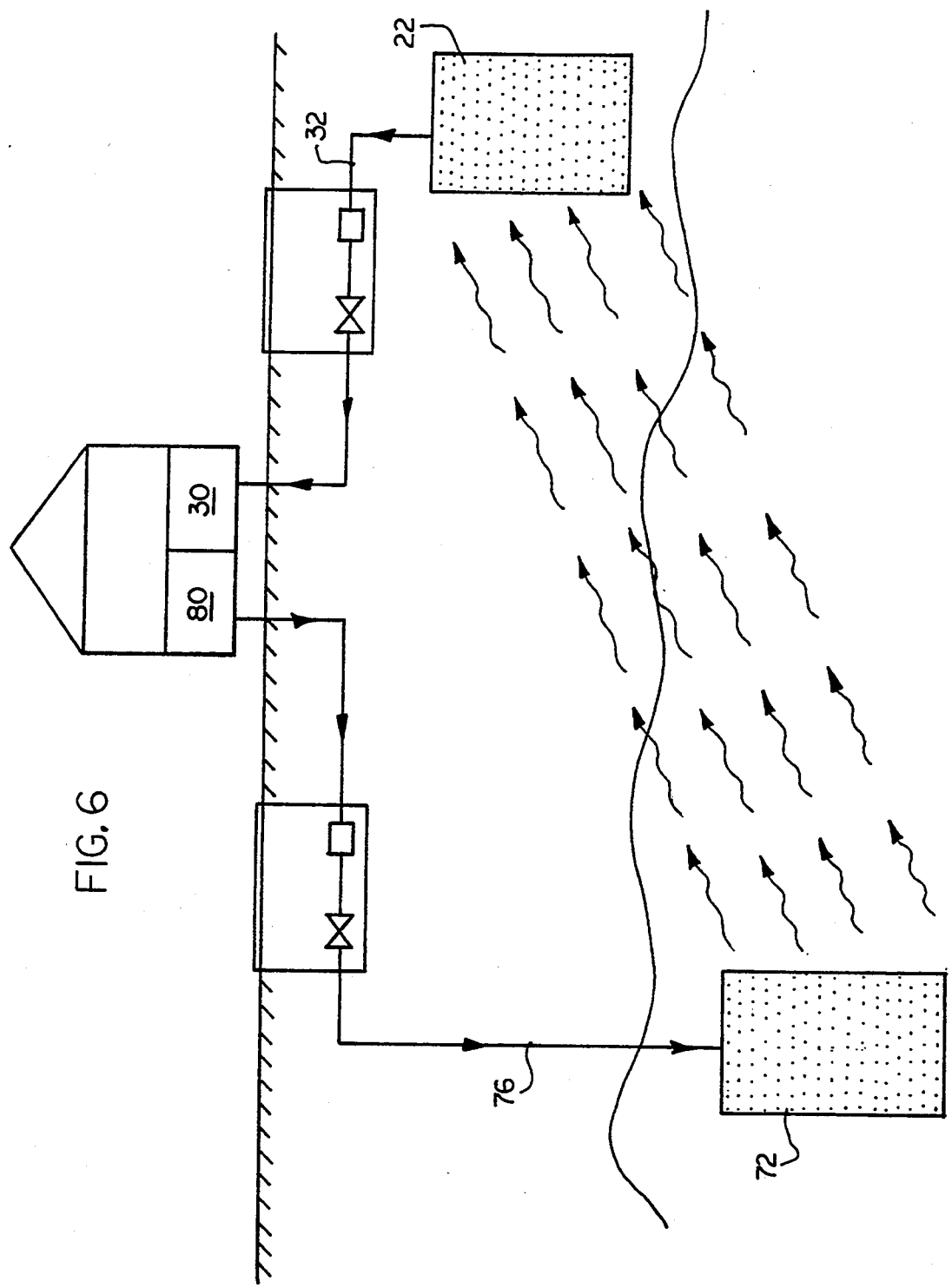
Figure 7:
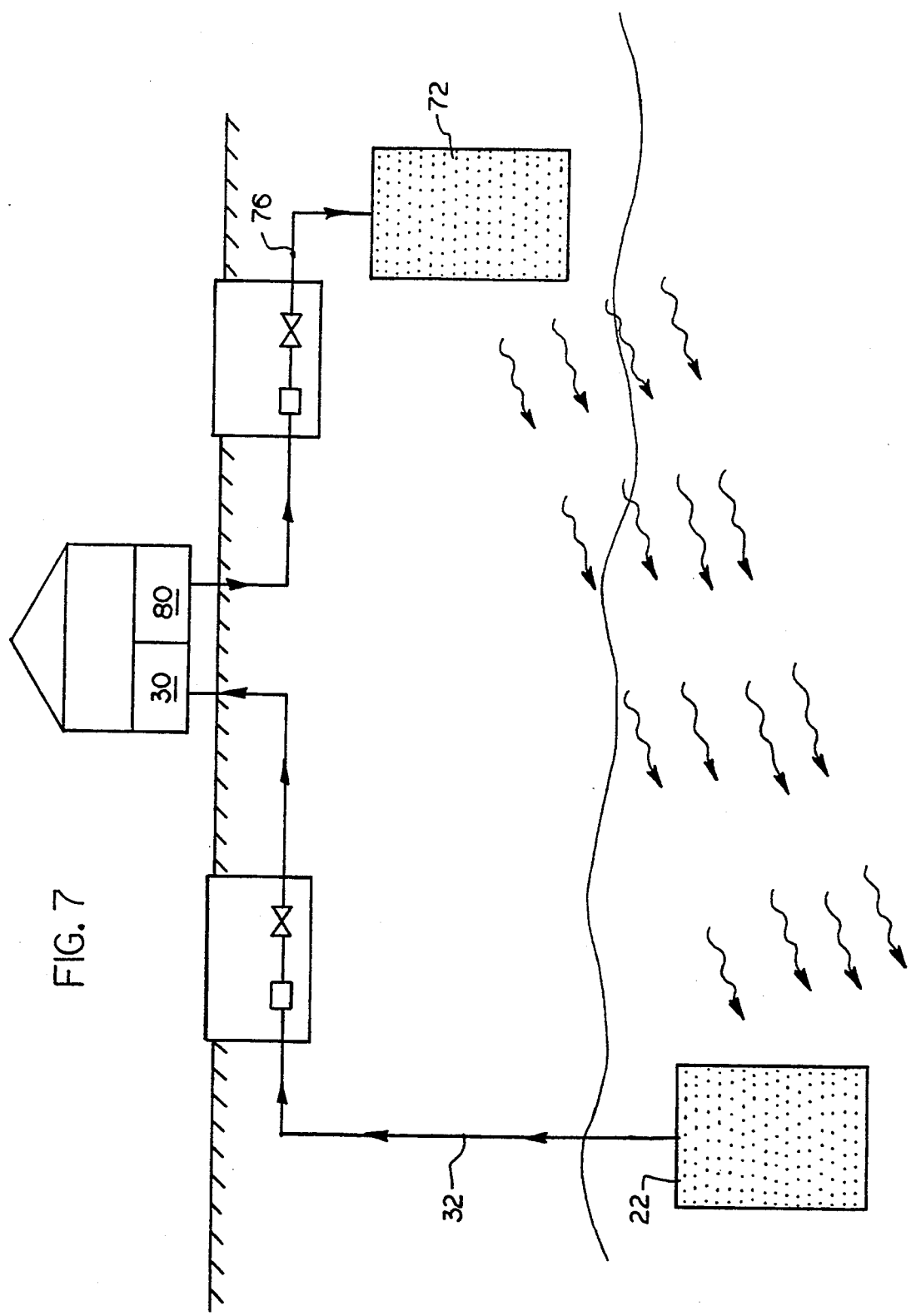

In FIG. 5, both piling are located in the vadose zone and air is injected into one of the pilings while a vacuum is maintained on the other one of the pilings. In FIG. 6, the vacuum piling is located in the vadose zone and the air pressurized piling is located in the saturated zone. In FIG. 7, the vacuum piling is located in the saturated zone and liquid is injected in the piling located in the vadose zone. Finally, in FIG. 8, botch piling are located in the saturated zone and liquid is injected into one of the pilings while a vacuum is maintained on the other one of the pilings.

In the second embodiment (FIG. 5), intermediate ones of the pilings within the vadose zone are pressurized either by air or liquid fluids in either a heated or unheated state to transport or facilitate the biodegradation of VOC organic contaminates into another alternating vertical piling within the vadose zone having a negative pressure.

In the third embodiment (FIG. 6), intermediate ones of the vertical pilings installed within the saturated zone are pressurized either by air or liquid fluids in either a heated or unheated state to remove contaminates from the saturated zone while other alternating pilings being in the vadose zone exert a negative pressure, to transport or facilitate the biodegradation of contaminates from the saturated and vadose zones to collection within the negative pilings and transported by piping to the surface.

In the fourth embodiment (FIG. 7), intermediate ones of the vertical pilings within the vadose zone are pressurized by liquid fluids in either a heated or unheated state to transport or facilitate the biodegradation of contaminates within the vadose and/or saturated zone while other alternating vertical pilings within the saturated zone are used for recovery of the contaminates, ground water, or other liquids.

In the fifth embodiment (FIG. 8), intermediate ones of the vertical pilings installed within the saturated zone are pressurized by liquid fluids in either a heated or unheated state to transport or facilitate biodegradation of contaminates within the saturated zone while other alternating pilings within the saturated zone being connected to a pumping system are used for interception and recovery.

According to the present invention, the function of the second injection piling may also be performed by a conventional vertical well. However, it is believed that the effectiveness of a vertical well may be somewhat less than the higher surface area pilings of the present invention. Like the unassisted PEP system 12, the second piling 72 of the alternative embodiments of the present invention is connected to a vertical riser 76 of schedule 40 PVC pipe near its midportion. An oil-less type fluid pump 80 is connected at the riser 76 for creating a source of positive air or liquid fluid pressure. A pressure gauge located adjacent to the pump 80 provides a measurement of the pressure at the pump. Like the unassisted PEP system 12, several "nests" of vacuum monitoring wells 50 are placed at specific distances and depths with respect to the piling 22 to monitor the ROI of the PEP system in the surrounding soil. Each nest includes several monitors 52 each at different depths to measure the pressure differential with respect to adjacent zones. The method and apparatus according to the present invention will become more apparent upon reviewing the following detailed examples.

EXAMPLE NO.1

A conventional 4 inch diameter well was installed to a depth of 15 feet. Slotted PVC pipe was utilized for the bottom 12 feet of the well. A 1½ hp vacuum pump capable of 13 CFM at 10 inches of Hg was connected to the well head. The ROI of the well was measured to be 10 feet (314 ft$^2$).

Based on the initial ROI data, twelve additional wells were installed in order to provide coverage for an area of approximately 80 feet by 80 feet (6400 ft$^2$). A second vacuum pump capable of 320 CFM at 15 inches of Hg was then connected to a piping manifold leading to each of the twelve wells. Air flow from well was measured and varied from between about 14 CFM to about 24 CFM.

The effectiveness at the well head of the 4 inch diameter wells was calculated (CFM/2*pi*r*d) based upon a 9 inch diameter bore, 12 feet of effective depth, and a maximum of 24 CFM at 15 inches of Hg to be 0.85 CFM/ft$^2$ of vertical surface area at the well head.

Similarly, the effectiveness at the ROI of the 4 inch diameter wells was calculated (CFM/2*pi*r*d) based upon a 10 feet radius ROI, 12 feet of effective depth, and a maximum of 24 CFM at 15 inches of Hg to be 0.032 CFM/ft$^2$ of vertical surface area at the ROI.

Finally, the surface area effectiveness at the ROI of the 4 inch diameter wells was calculated (pi*r$^2$/CFM*d) based upon the 10 feet radius ROI, 12 feet of effective depth, and a maximum of 24 CFM at 15 inches of Hg to be 1.09 ft$^2$/CFM/ft of horizontal surface area at the ROI.

EXAMPLE NO.2

Based on preliminary data, a perforated extraction piling (PEP), constructed according to the present invention, was installed similar to 12 in FIG. 1 using two pilings piped together for an overall width of 4 feet. The pilings were spaced apart a distance of 7 feet. The overall dimensions of each of piling were 14 feet long by 2 feet wide. The lower 11 feet of both sides of each piling was perforated with ¼ inch diameter holes over 40% of its surface. The thickness of the piling was approximately 1½ inches. A vertical riser of schedule 40 PVC pipe was connected to each of the pilings near its midportion. A 6 mil polyethylene sheet was laid over the upper portion of each piling to prevent surface air and water from entering the PEP. The final 2½ feet of above the PEP was filled with a mixture of backfill and bentonite clay to form a water and air resistant cap above the PEP.

A vacuum pump capable of about 75 CFM at 15 inches of Hg was then connected to the pipe riser leading to the horizontal slotted pipe in the bottom of the PEP. Air flow of the PEP was calculated to be about 80 CFM at only 5 inches of Hg. Estimated CFM of the PEP at 15 inches of Hg was calculated to be about 140 CFM (CFM=k*(difference in pressure (psi))$^{\frac{1}{2}}$). The ROI of the two piling prototype PEP was measured to be 57 feet by 46 feet (2*23*57=2622 ft$^2$).

The effectiveness at the surface of the piling of the PEP was calculated (CFM/2dL) based upon a 4 foot total width, 11 feet of effective depth, and a maximum of 80 CFM at 5 inches of Hg to be 0.90 CFM/ft$^2$ of vertical surface area at the piling surface which is approximately equal to the value of the vertical well ISVE system in Example 1 at 10 inches of Hg less. At a calculated flow of 140 CFM and 15 inches of Hg, the effectiveness at the piling surface was estimated to be about 1.59 CFM/ft$^2$.

Similarly, the effectiveness at the ROI of the PEP was calculated (CFM/2dL) based upon a 57 feet by 46 feet total area, 11 feet of effective depth, and a maximum of 80 CFM at 5 inches of Hg to be 0.035 CFM/ft$^2$ of vertical surface area at the ROI. This value is approximately equal to the value of the vertical well ISVE system in Example 1 at 10 inches of Hg less.

Finally, the surface area effectiveness at the ROI of the PEP was calculated (2rL/CFM*d) based upon a 46 by 57 foot ROI, 11 feet of effective depth, and a maximum of 80 CFM at 5 inches of Hg to be 2.98 ft$^2$/CFM/ft of horizontal surface area at the ROI. This value is three times that of the vertical well ISVE system in Example 1 at 10 inches of Hg less.

From the above Examples it is clear that at depths of between about 20 to 50 feet the PEP ISVE system is as effective at its ROI as a vertical well ISVE at a lower vacuum level. This permits high CFM operation at low vacuums levels which provides less lift to the ground water, thereby resulting in less waste water entering the vacuum extraction system.

Furthermore, the piling design of the PEP ISVE system does not require the high degree of "lapping" required by a vertical well ISVE to provide complete coverage of the contaminated area. Moreover, the seal design of the, PEP ISVE system minimizes "short circuiting" by surface air and infiltration of surface water.

In the above Examples, the present invention was directed to removal of VOC's from the vadose zone. However, as discussed above, the present invention also may be used in combination with a system for removing contaminates from contaminated groundwater adjacent to the vadose zone. Thus, one or more pumps can be added to remove groundwater from the aquifer, treat it to remove the contaminates, and return it to the aquifer.

Certain other modifications and improvements will occur to those skilled in the art upon reading of the foregoing description. By way of example, while the PEP ISVE system of the present invention has been shown laid out in straight line or criss-cross arrangements, other geometries including serpentine and spiral configurations could be equally desirable, particularly when the contours of the surface and the VOC contaminate plumes are not linear. The pilings can be constructed of chemically compatible materials suitable to withstand forces encountered during conventional pile driving. These materials include, but are not limited to, steel, stainless-steel, aluminum, and high density plastics or a combination of these. They may have one or several sides of perforated material, pipe connection, and means for attaching withdrawal equipment. It should be understood that all such modifications and improvements have been deleted herein for the sake of conciseness and readability but are properly within the scope of the following claims.

We claim:

1. An apparatus for removing volatile contaminates from the vadose and saturated zones of a contaminated area, said apparatus being installed in such a manner as to minimize excavation of contaminated soil from the area, said apparatus comprising:
    (a) an elongated piling, having a pair of substantially parallel, downwardly extending walls, the width of said walls being substantially greater than the distance between said walls and a bottom having a tapered driver element which is driven into the soil to pull the remainder of the piling along with it, adjacent to said contaminated area; said piling having at least one perforated wall portion for receiving said volatile contaminates;
    (b) a conduit connected to said piling, said conduit having a imperforate portion for conducting said volatile contaminates from said piling;
    (c) sealing means upon the upper portion of said piling for preventing the entry air or other fluids from the surface above said piling into said piling; and
    (d) pump means connected to said conduit for pumping said volatile contaminates from said vadose and saturate zones, through at least one of said side walls of said piling through said conduit.

2. The apparatus according to claim 1, wherein said sealing means upon the upper portion of said piling for preventing the entry air or other fluids from the surface of said piling into said permeable fill material includes a fill material of low fluid permeability.

3. The apparatus according to claim 2, wherein said fill material of low fluid permeability includes a mixture of backfill and bentonite clay.

4. The apparatus according to claim 1, wherein said sealing means upon the upper portion of said piling for preventing the entry air or other fluids from the surface above said piling into said piling includes a sheet of polyethylene plastic above the surface of said piling.

5. The apparatus according to claim 4, further including a second fill material to prevent the movement of said sheet of polyethylene plastic.

6. The apparatus according to claim 1, further including means for delineating the location and depth of said contaminated area prior to locating said piling.

7. The apparatus according to claim 1, further including means for treating said volatile contaminates by mechanical, thermal, chemical, or biological means to render said contaminants harmless.

8. The apparatus according to claim 1, wherein said piling is located adjacent to the water table associated with said contaminated area.

9. The apparatus according to claim 1, wherein said perforated portion of said piling includes a plurality of apertures having an average diameter of between about 1/16 and ¾ inches.

10. A collector for an apparatus for removing volatile contaminates from the vadose and saturated zones of a contaminated area, said collector being installed in such a manner as to minimize excavation of contaminated soil from the area, said collector comprising:
    (a) an elongated piling, having a pair of substantially parallel downwardly extending walls, the width of said walls being substantially greater than the distance between said walls and a bottom having a tapered driver element which is driven into the soil to pull the remainder of the piling along with it, adjacent to said contaminated area; said piling having at least one perforated wall portion for receiving said volatile contaminates; and
    (b) a conduit connected to said piling, said conduit having a imperforate portion for conducting said volatile contaminates from said piling.

11. The apparatus according to claim 10, further including sealing means upon the upper portion of said piling for preventing the entry air or other fluids from the surface above said piling into said piling.

12. The apparatus according to claim 10, wherein said perforated portion of said piling includes a plurality of apertures having an average diameter of between about 1/16 and ¾ inches.

13. The apparatus according to claim 10, wherein said perforated portion of said piling is between about 75% to 100% of the height of said piling.

14. The apparatus according to claim 10, wherein both walls of said piling include a perforated wall portion for receiving said volatile contaminates.

15. An apparatus for removing volatile contaminates from the vadose and saturated zones of a contaminated area, said apparatus being installed in such a manner as to minimize excavation of contaminated soil from the area, said apparatus comprising:
    (a) an elongated piling, having a pair of substantially parallel, downwardly extending walls, the width of said walls being substantially greater than the distance between said walls and a bottom having a tapered driver element which is driven into the soil to pull the remainder of the piling along with it, adjacent to said contaminated area; said piling having at least one perforated wall portion for receiving said volatile contaminates;
    (b) a conduit connected to said piling, said conduit having a imperforate portion for conducting said volatile contaminates from said piling;
    (c) sealing means upon the upper portion of said piling for preventing the entry air or other fluids from the surface above said piling into said piling;
    (d) pump means connected to said conduit for pumping said volatile contaminates from said vadose and saturate zones, through at least one of said side walls of said piling through said conduit;
    (e) a second conduit positioned adjacent to said piling, said second conduit having a perforated portion for supplying a fluid;
    (f) a third conduit connected to said second conduit, said third conduit having a imperforate portion for conducting said fluid to said second conduit; and (g) second pump means connected to said third conduit for pumping said fluid through said third conduit, into said second conduit, through at least one of said side walls of said piling, and said vadose zone, whereby said fluid from said second pump means is drawn across said contaminated area by said pump means so that said volatile contaminates are carried with said fluid to the surface.

16. The apparatus according to claim 15, wherein said sealing means upon the upper portion of said piling for preventing the entry air or other fluids from the surface above said piling includes a fill material of low fluid permeability.

17. The apparatus according to claim 16, wherein said fill material of low fluid permeability includes a mixture of backfill and bentonite clay.

18. The apparatus according to claim 15, wherein said sealing means upon the upper portion of said piling for preventing the entry air or other fluids from the surface above said piling includes a sheet of polyethylene plastic above the surface of said piling.

19. The apparatus according to claim 18, further including a second fill material to prevent the movement of said sheet of polyethylene plastic.

20. The apparatus according to claim 15, further including means for delineating the location and depth of said contaminated area prior to locating said piling.

21. The apparatus according to claim 15, further including means for treating said volatile contaminates by mechanical, thermal, chemical, or biological means to render said contaminants harmless.

22. The apparatus according to claim 15, wherein said piling is located adjacent to the water table associated with said contaminated area.

23. The apparatus according to claim 15, wherein said third conduit includes an elongated piling, having a pair of downwardly extending walls and a bottom, adjacent to said contaminated area; said piling having a perforated wall portion for receiving said volatile contaminates; and sealing means upon the upper portion of said piling for preventing the entry air or other fluids from the surface above said piling into said piling.

* * * * *